Aug. 6, 1957     R. J. GAUBERT     2,801,732
WEIGHING MACHINE
Filed April 27, 1951     8 Sheets—Sheet 1
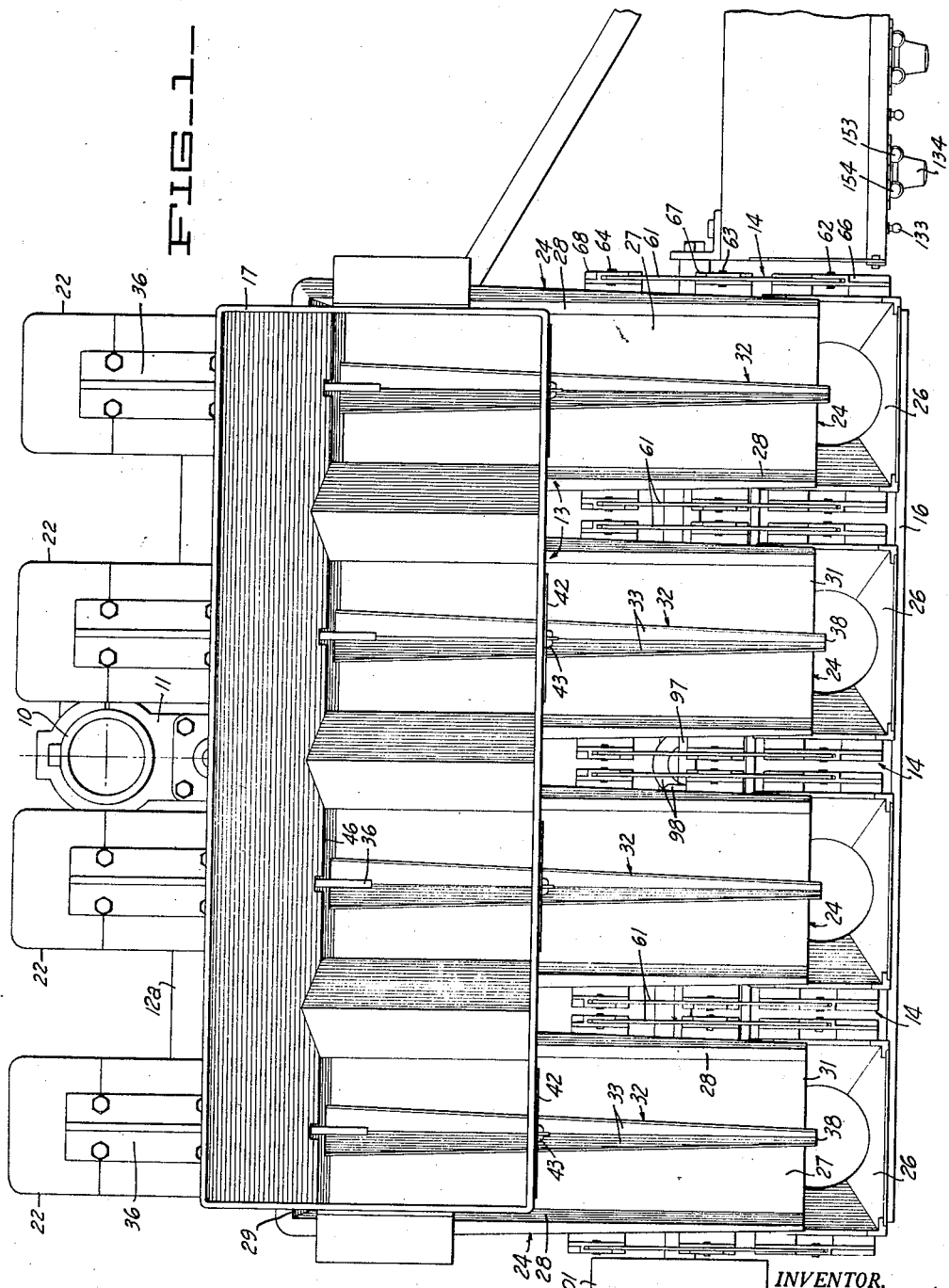
INVENTOR.
Rene J. Gaubert
BY
ATTORNEYS

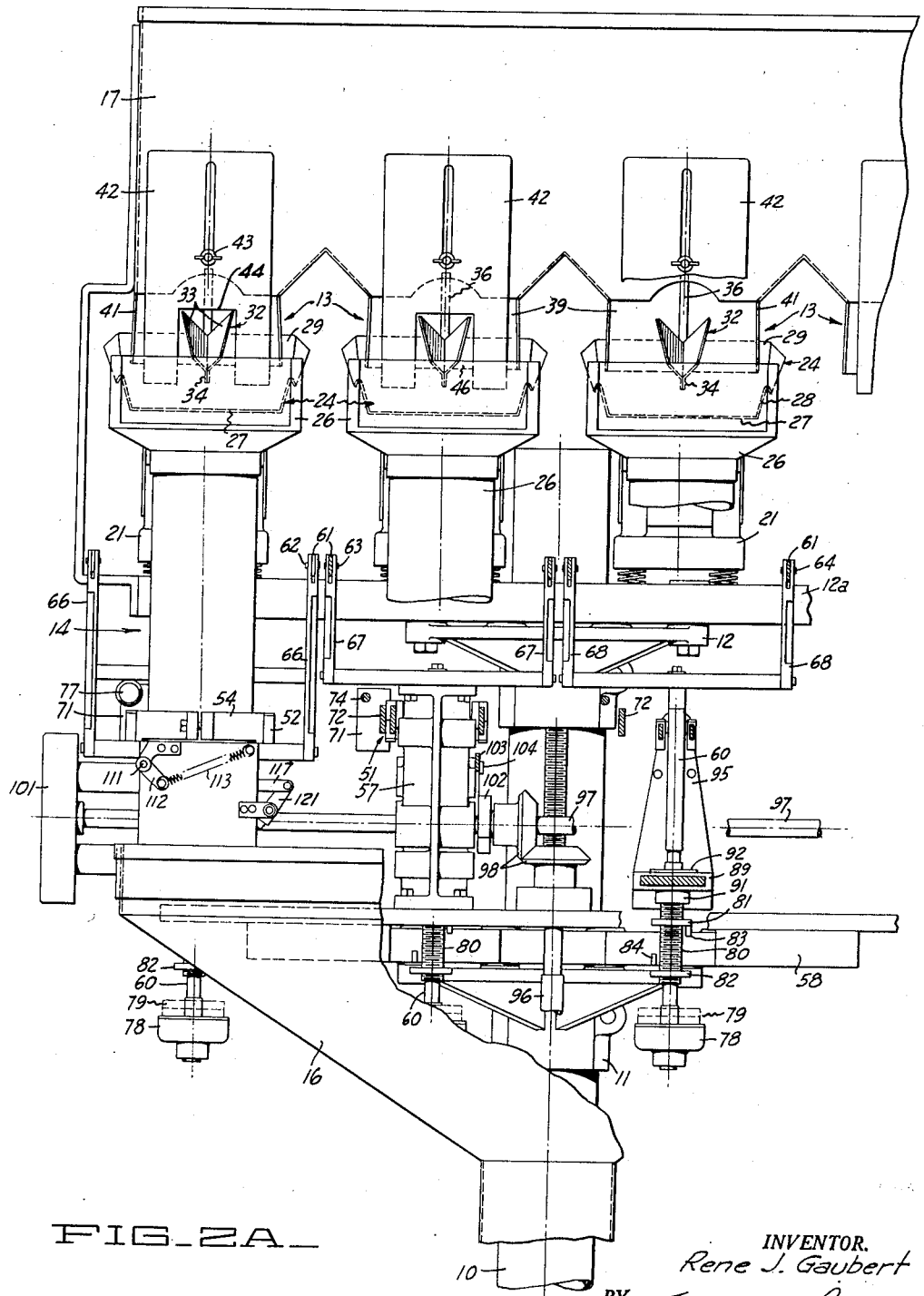

Aug. 6, 1957　　　　R. J. GAUBERT　　　　2,801,732
WEIGHING MACHINE
Filed April 27, 1951　　　　　　　　　　　　　　8 Sheets-Sheet 3
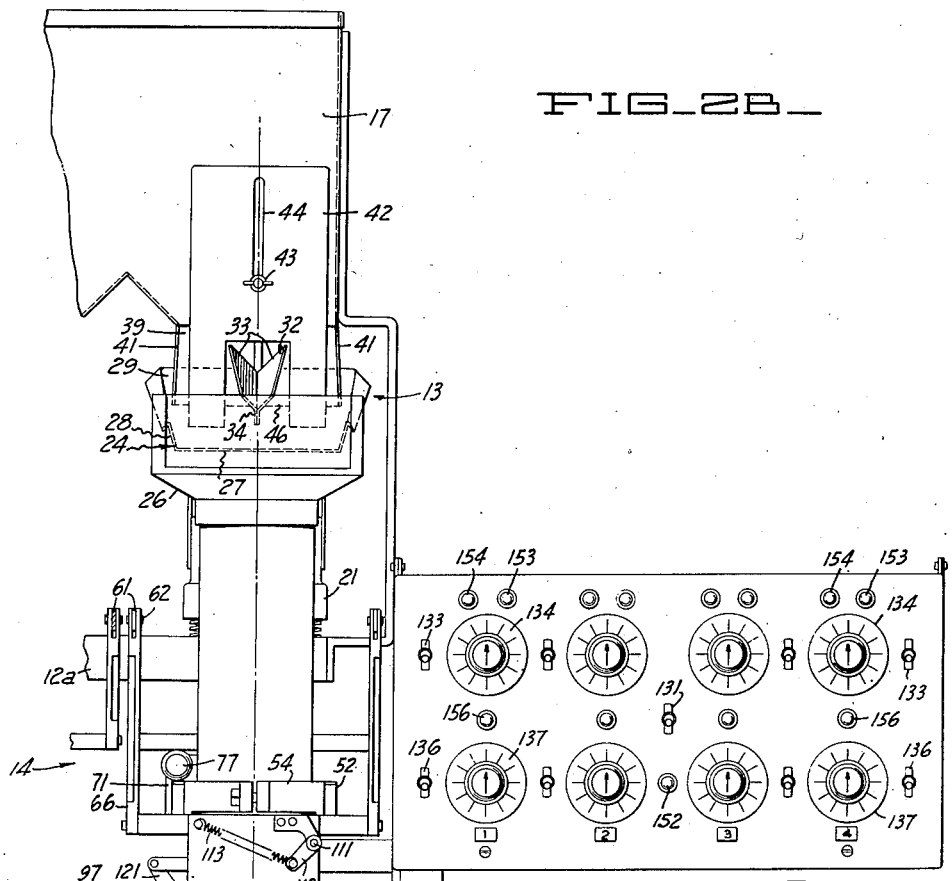
FIG_2B_
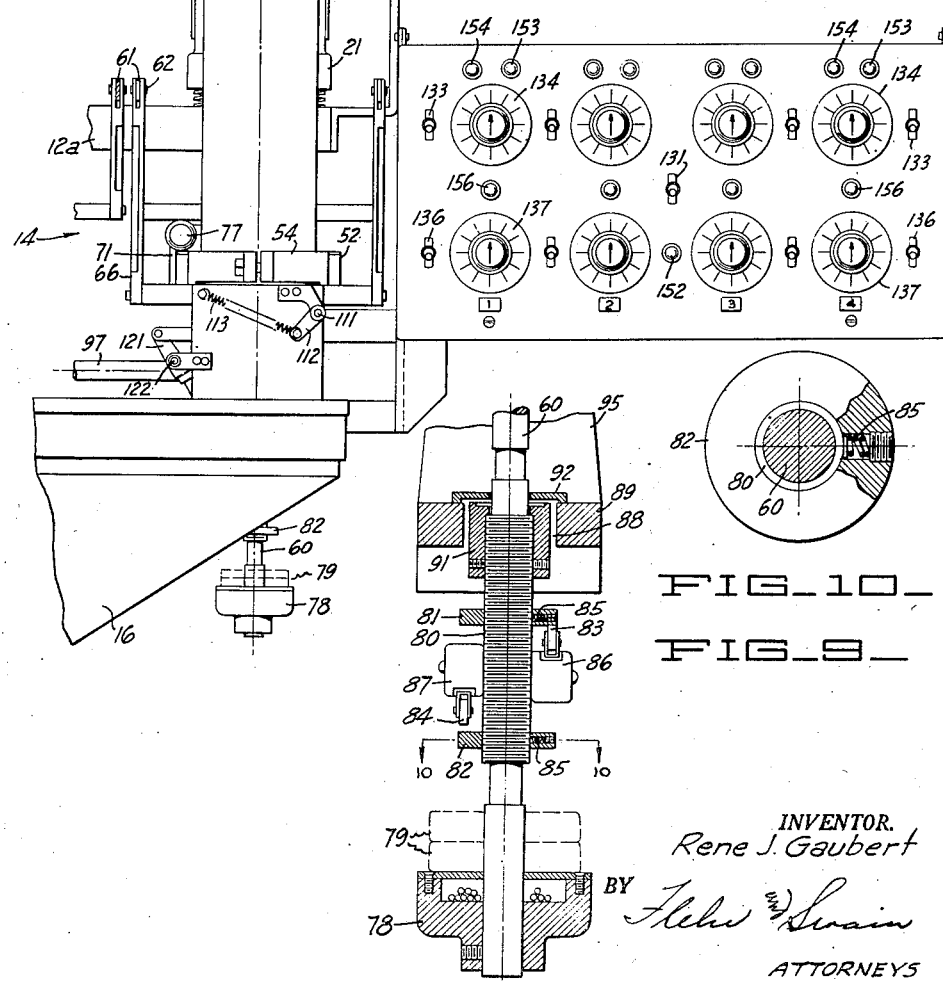
FIG_10_
FIG_9_
INVENTOR.
Rene J. Gaubert
BY
ATTORNEYS

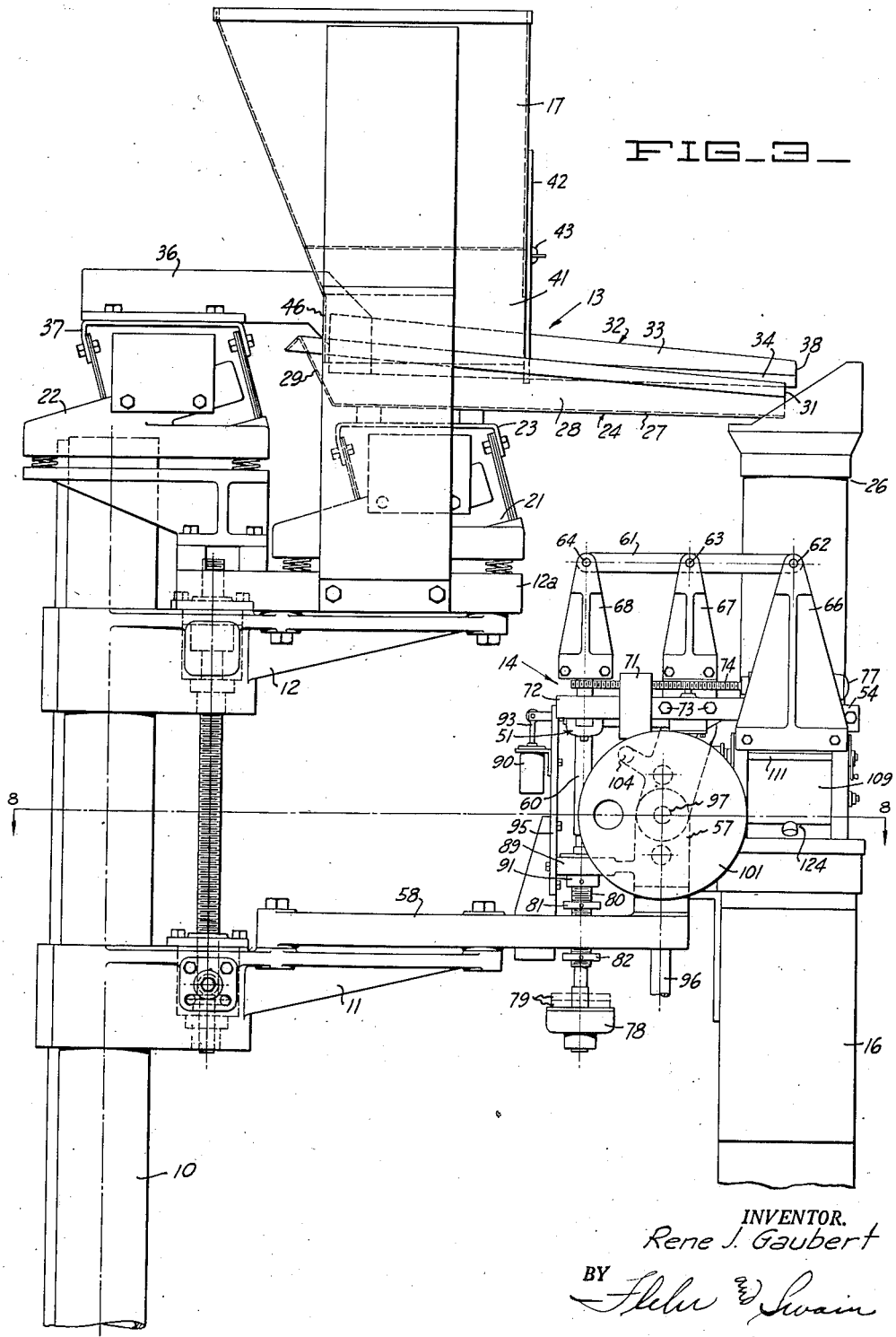

Aug. 6, 1957
R. J. GAUBERT
2,801,732
WEIGHING MACHINE
Filed April 27, 1951
8 Sheets-Sheet 5
FIG_4_
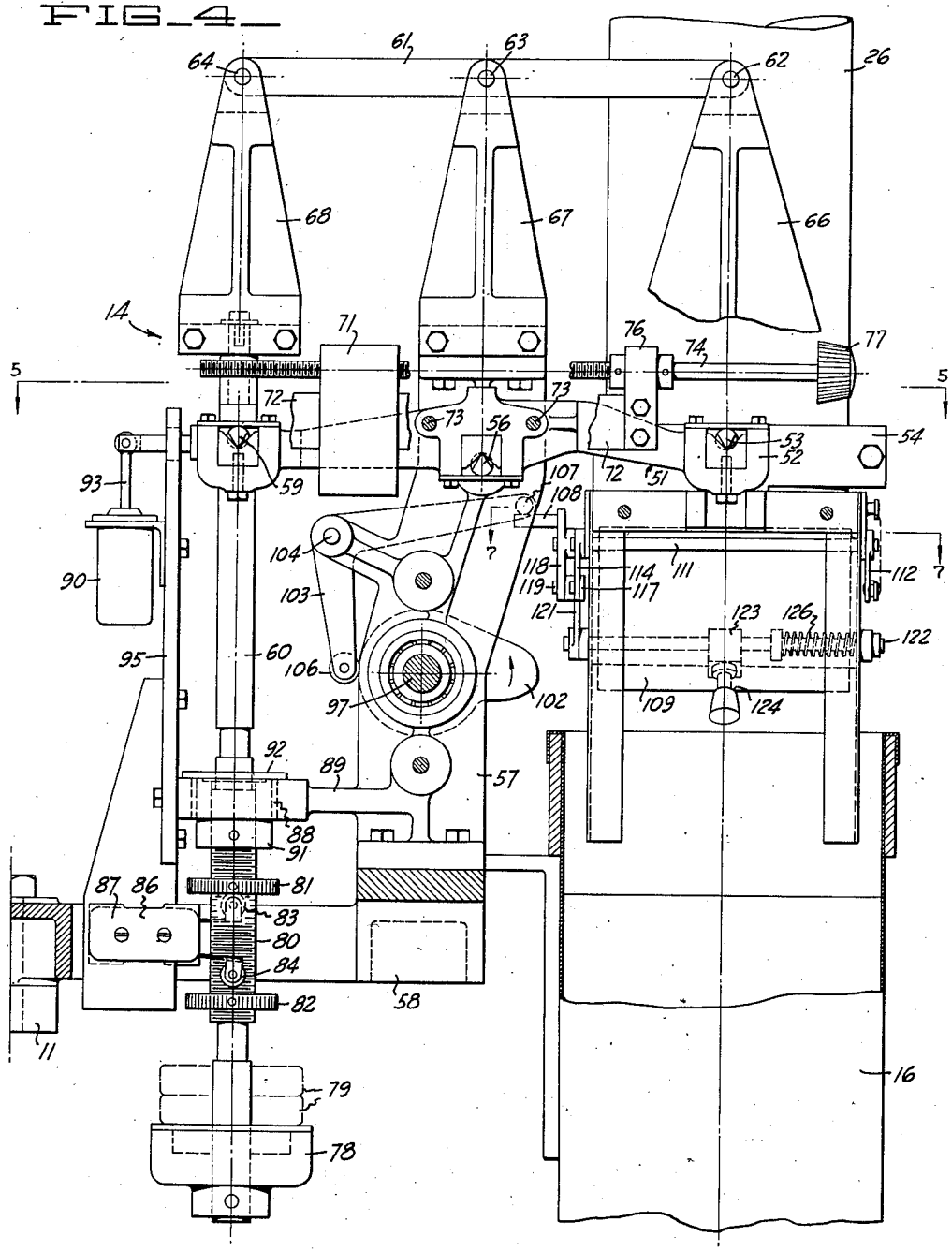
INVENTOR.
Rene J. Gaubert
BY
ATTORNEYS

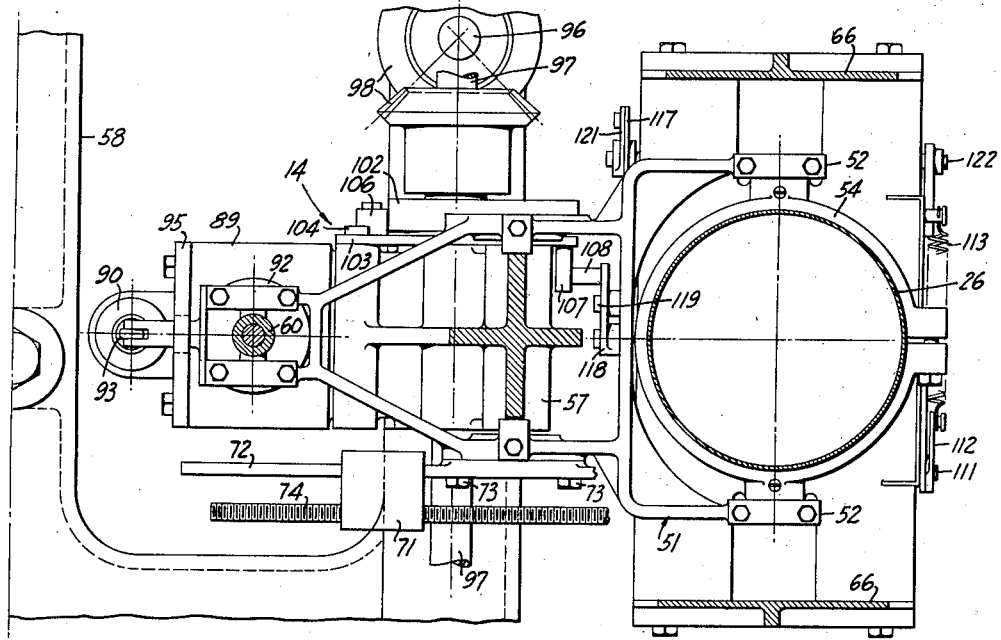

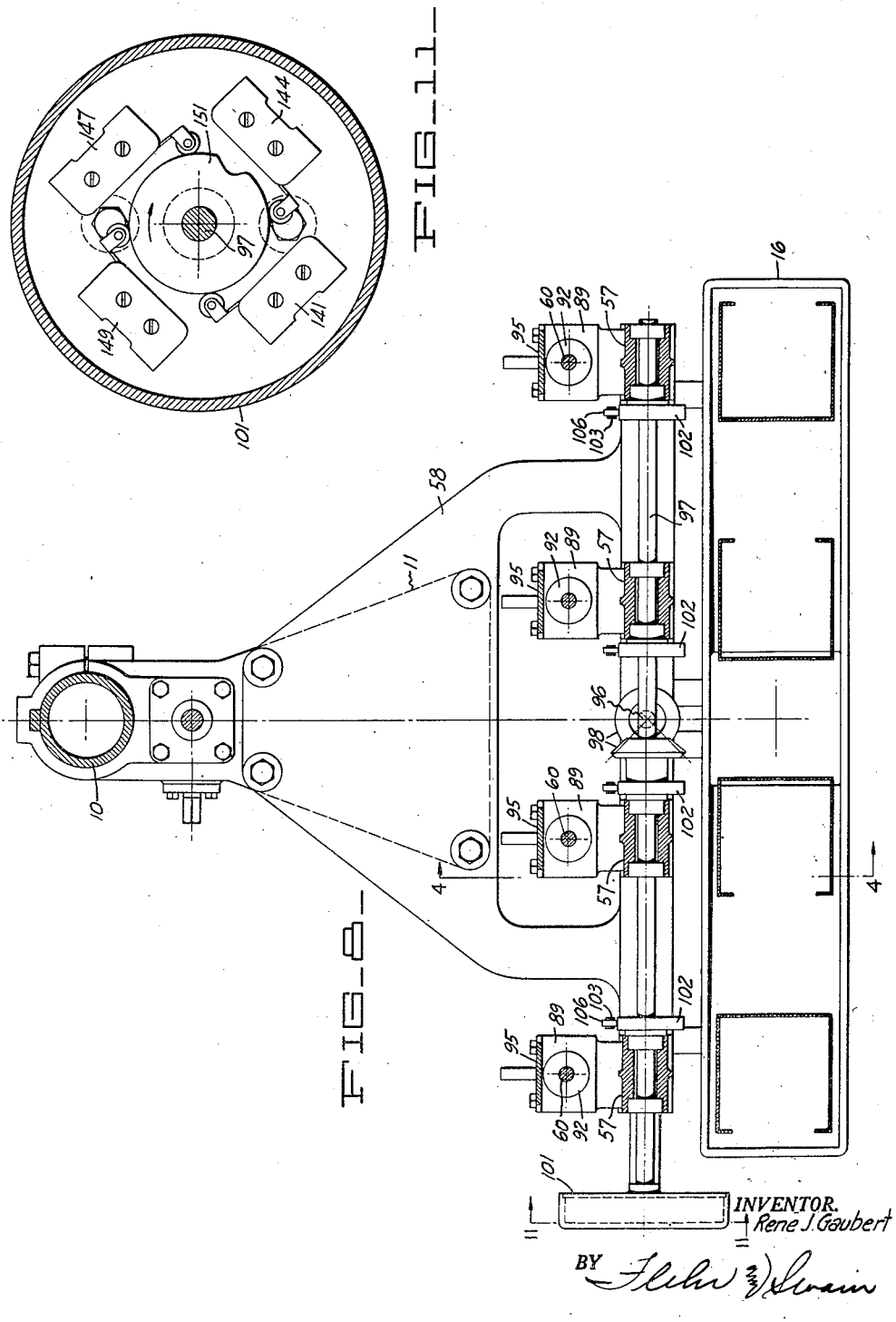

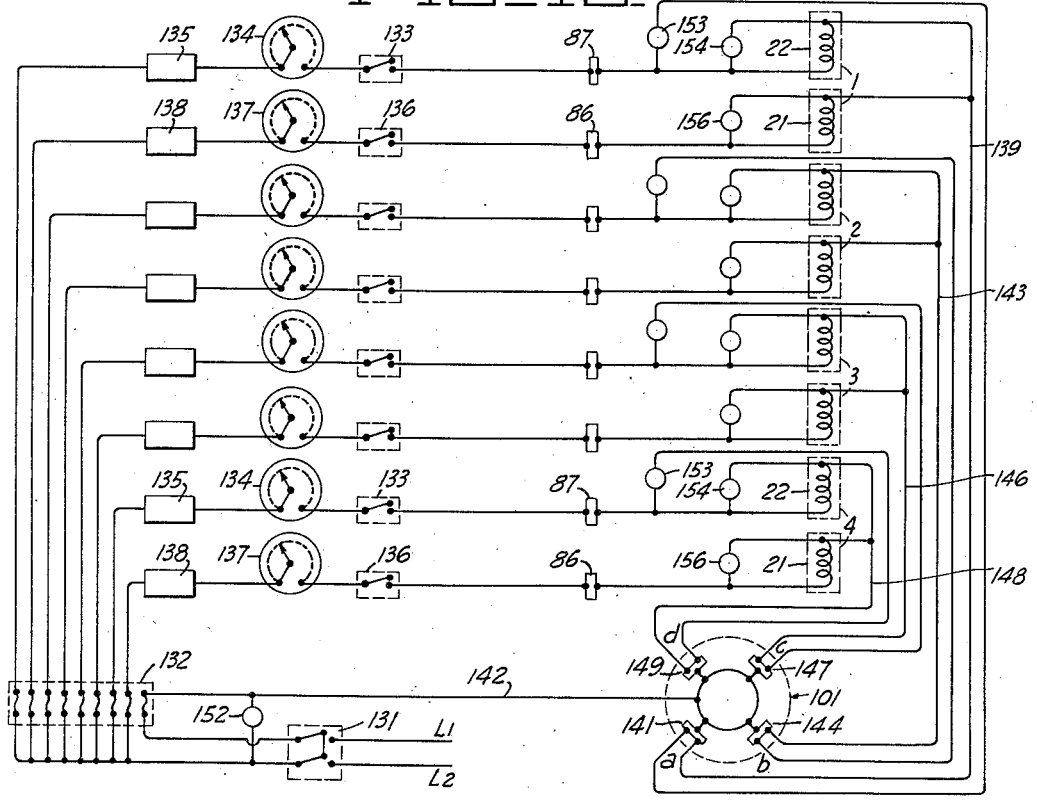
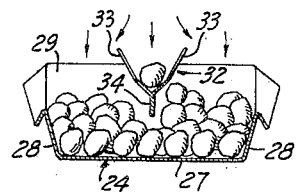
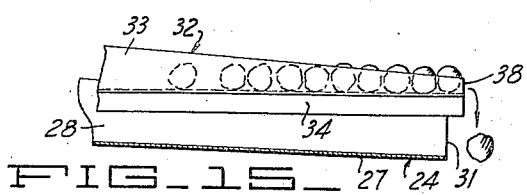

United States Patent Office 2,801,732
Patented Aug. 6, 1957

2,801,732

WEIGHING MACHINE

Rene J. Gaubert, Oakland, Calif., assignor, by mesne assignments, to Food Machinery and Chemical Corporation, San Jose, Calif., a corporation of Delaware Application April 27, 1951, Serial No. 223,387

6 Claims. (Cl. 198—220)

This invention relates generally to machines for carrying out successive automatic weighing operations. It is particularly applicable to machines for introducing weighed quantities of various products into bags or cartons.

It is an object of the invention to provide automatic apparatus of the above character which is capable of providing a relatively accurate weigh for successive operations.

Another object of the invention is to provide a machine of the above character which can be readily adjusted for products varying widely as to size, physical shape, and other characteristics.

Another object of the invention is to provide a machine of the above character having novel means for providing both bulk and dribble feeds, and which in particular will provided dribble feed devices which can operate to deliver individual articles one at a time.

Another object of the invention is to provide automatic weighing machines which are well adapted for use with a bag making and handling machine of the type disclosed and claimed in my copending application Serial No. 214,880, filed March 10, 1951, and now Patent No. 2,773,341.

Additional objects and features of the invention will appear from the following description in which the preferred embodiment has been set forth in detail in conjunction with the accompanying drawing.

Referring to the drawing:

Figure 1 is a plan view of a weighing machine incorporating the present invention.

Figures 2A and 2B, taken together, form a side elevational view illustrating the machine of Figure 1, and with certain parts being broken away.

Figure 3 is an end view looking toward the left hand end of the machine as illustrated in Figure 2A.

Figure 4 is an enlarged end elevational view of the machine, showing certain parts in section, and serving to illustrate the weight balancing means employed.

Figure 5 is a cross-sectional view taken along the line 5—5 of Figure 4.

Figure 6 is an enlarged side elevational detail illustrating the discharge gate used in connection with each weighing device.

Figure 7 is a cross-sectional view taken along the line 7—7 of Figure 4.

Figure 8 is a cross-sectional view taken along the line 8—8 of Figure 3.

Figure 9 is a detail assembly in cross-section illustrating the arrangement of balance weights and switches used in conjunction with each weighing device.

Figure 10 is a cross-sectional detail taken along the line 10—10 of Figure 9.

Figure 11 is a cross-sectional detail taken along the line 11—11 of Figure 8.

Figure 12 is a diagrammatic electrical circuit.

Figures 13, 14 and 15 are schematic views serving to illustrate operation of the bulk and dribble feed troughs.

The machine illustrated in the drawing is constructed for mounting upon the frame of a bag handling machine, as for example a machine of the type disclosed in my application Serial No. 214,880. As will be presently explained certain parts of the present machine are mechanically connected to be driven from parts of the bag handling machine. This serves to carry out the weighing operations in timed relation with movement of bags or cartons into a filling position for receiving weighed quantities of a product.

The principal parts of the present machine are carried by the standard or post 10 (Figure 3) which has its lower end carried by a suitable base structure. A bracket 11 is secured to the post 10 and serves to support the automatic weighing devices. Another bracket 12 is vertically adjustable and serves to carry means for feeding products to the various weighing devices.

By reference to Figure 1, taken together with Figures 2A and 2B, it will be noted that the machine includes a plurality of duplicate feed devices 13, each of which delivers material to an associated weighing device designated generally at 14 (Figure 2A). All of the weighing devices are arranged to discharge the weighed material into the common hopper 16, which in turn delivers the weighed quantities to a bag or carton. A common hopper 17 serves to supply the product to the several feed devices 13. As will presently be explained, it is desirable to provide a plurality of feed and weighing devices for each complete machine in order to increase the speed of operation of bag or carton filling operations.

Each feed means 13 has novel features and is constructed as follows: A pair of magnetic vibrators 21 and 22 (Figure 3), such as are commonly used with conveyors of the shaker type, are mounted upon the table 12a on the bracket 12. The operating member 23 of the vibrator 21 is attached to the shallow trough-like bulk conveyor 24. This conveyor extends cantilever fashion from the lower end of the hopper 17 to a location from which it discharges into the receiving container 26 of the associated weighing device. Specifically each trough-like conveyor 24 includes the bottom wall 27, the side walls 28, and the rear end wall 29. The forward end 31 is open and discharges into the container 26 (Figure 3).

Each feed conveyor 24 extends beneath a dribble feed conveyor 32. This dribble feed conveyor is likewise trough-like in form and can include walls 33 having their lower edges secured together along a fin 34 by welding or like means. This serves to form a relatively small trough which is V-shaped in cross-sectional contour. The rear end of the dribble feed trough 32 is secured to a fin-like arm 36, which in turn is attached to the operating member 37 of the vibrator 22. As will presently be explained, the electrical circuit means connected to the vibrators 21 and 22 is arranged whereby the vibrator 22 is operated independently of the vibrator 21 to supply articles one by one to the container 26. The discharge end 38 of each dribble conveyor 32 extends beyond the discharge end 31 of the conveyor 24, although the arrangement is such that both conveyors discharge into the same container 26.

The hopper 17 is adapted to supply articles to both the bulk and dribble conveyors of each of the feed devices 13. Thus as illustrated in Figure 2A, the hopper 17 is provided with a plurality of lower discharge openings 39, each of which is arranged to deliver articles to the main and dribble conveyors associated with the same. In order to prevent spill from the main conveyor, side extensions 41 extend downwardly to a level below the adjacent portions of the side walls 28. A front wall 42 can be adjusted by loosening and tightening the wing nut 43, and is provided with a slot 44 to accommodate the adjacent portion of the dribble conveyor 32. The rear wall 46 which extends down alongside the rear of each opening 39, terminates at a point below the upper edge of the wall 29, and is slotted to accommodate the arm 36.

Each of the feed devices 13 operates as follows: Assuming that the hopper 17 contains an ample quantity of a product, which may for example be dried prunes, operation of the vibrator 21 with or without operation of the vibrator 22, causes the prunes to be conveyed along the bulk conveyor 24 and discharge into the container 26. When one interrupts operation of vibrator 21, the prunes stop their forward movement, and thereafter operation of vibrator 22 causes the prunes to move along the conveyor 32 one behind the other or in single file, whereby they drop off the discharge end 38 to complete the weigh.

The conveying rate of both the bulk and dribble conveying devices can be controlled by adjusting excitation of the vibrators 21 and 22. Likewise some adjustment in the conveying rate can be had by adjusting the gate or wall 42. Also adjustment of this gate can be employed to adapt the device to the handling of different types of articles.

The cooperative relationship of the dribble conveyor to the bulk conveyor is particularly advantageous for several reasons. The positioning of the dribble conveyor directly over the main conveyor greatly facilitates discharge of both conveyors into a common container. In the operation of the dribble conveyor an excess number of articles may start down the conveyor trough and as these articles arrange themselves in single file, some articles generally fall from the conveyor. With my arrangement such articles simply fall into the main conveyor trough and do not affect the accuracy of the weigh. The extension of the dribble trough with its discharge end 38 projecting beyond the discharge end 31 of the conveyor 24 enables articles to drop one by one from the dribble conveyor without dislodging articles at rest upon the main conveyor. This feature likewise makes for accuracy of the weigh.

Each of the weighing devices 14 includes weighing or scale means of the balancing beam type associated with a corresponding container 26. Thus a balancing or scale beam 51 has a forward forked end 52 which has knife edge fulcrum connections 53 with the mounting 54 for the container 26. An intermediate portion of the beam has knife edge fulcrum connections 56 with the stationary casting 57, the latter being carried by the table 58 which in turn is carried by bracket 11. The rear end of the beam 51 has knife edge fulcrum connections 59 with a vertical movable rod 60 (Figures 4 and 9).

In order to secure parallel vertical movements of the container 26 and the rod 60, a lever 61 is disposed above the beam 51, and has pivotal connections 62, 63 and 64 with the three pairs of stanchion brackets 66, 67 and 68. The brackets 66 are disposed on opposite sides of the associated container 26 and are rigidly secured to the mounting 54. The brackets 67 form pivotal connections for both the levers 61 and are fixed to the stationary casting 57. The brackets 68 form spaced pivotal connections 64 for the two levers 61, and are attached to the upper end of the rod 60 above the fulcrum 59.

To facilitate making adjustments I provide a balancing weight 71 which is slidably carried by the bar 72. This bar is fixed by suitable means such as screws 73 (Figure 5) to the balancing beam 51. A rod 74 is journaled to a bracket 76 that is secured to a forward portion of the beam, and has a threaded portion which engages a nut carried by the weight 71. The forward end of rod 74 is provided with a knob 77 to facilitate manual adjustment. Turning of knob 77 moves the weight 71 along the bar 72, thus changing the weighting of the beam.

A member 78 (Figure 9) is attached to the lower end of each rod 60, and may serve to support one or more counterbalancing weights 79, as indicated by dotted lines. The rod 60 also has a threaded portion 80 which carries adjustable collars 81 and 82. These collars serve to engage the operating elements 83 and 84 of the electrical switches 86 and 87 and may be provided with a friction retention spring 85.

Above the collar 81 the rod extends through the opening 88 in the fixed member 89 (Figure 9) and is provided with another adjustable collar 91. A small weight 92 loosely surrounds the rod and normally rests upon the member 89. When the rod 60 moves upwardly from the position shown in Figure 9 the collar 91 picks up the member 92, thereby causing a small weight to be automatically added to the rod. As will be presently explained this is utilized to assist in producing an accurate weigh.

It is desirable to provide means for damping oscillations of the weighing beam 51. Thus a dashpot 90 is shown carried by the fixed support 95, and its operating member 93 is pivotally attached to the adjacent end of the weighing beam.

Previous reference has been made to use of the present invention with a bag making and handling machine of the type disclosed and claimed in my copending application Serial No. 214,880, filed March 10, 1951. In order to synchronize operation of the present machine with such bag making apparatus, I provide a vertical shaft 96 (Figure 2A) operatively connected to a suitable rotatable part of the bag making and handling machine, and which serves to drive the horizontal shaft 97 (Figure 8) through the miter gears 98. This shaft is journaled in the castings 57 and has its one end extending into the casing 101.

The shaft 97 (Figure 8) carries a plurality of cams 102, there being a cam for each of the weighing devices. Lever 103 (Figure 4) is associated with each cam, and is pivotally supported at 104 to the adjacent casting 57. The one arm of this lever is provided with a roller 106 which rides upon the associated cam 102. The other arm carries a pin 107 which engages an adjacent pin 108 when the lever is rocked in a clockwise direction as viewed in Figure 4.

Mounted at the lower end of each container 26 (Figure 6) there is a swinging gate 109, which is attached at one edge to the shaft 111. The forward end of this shaft carries an arm 112 which is attached to the tension spring 113 (Figure 2A).

The rear end of each shaft 111 is attached to an arm 114, and this arm in turn has a pin and slot lost motion connection 116 (Figure 6) with link 117. The pin 108 is carried by one arm of a rocker lever 118, and the other arm of this lever has a pivotal connection 119 with the link 117. One end of the link 117 is pivotally connected to an arm 121, which in turn is carried by the shaft 122. A latch lever 123 is secured to shaft 122, and is provided with a shoulder 124 for latching beneath the adjacent edge of the gate 109 (Figure 6). Shaft 122 carries the wire torsion spring 126, which tends to apply rotation to the shaft 122 in a direction to urge the latch 123 into engaged position.

With the arrangement just described, when a cam 102 oscillates corresponding lever 103 in a clockwise direction as viewed in Figure 4, pin 107 forces the adjacent pin 108 downwardly, and this rocks the lever 118 in a clockwise direction as viewed in Figure 6. The first movement of this lever within the limits of the lost motion connection 116 serves to release the latch 123 from the gate 109. Thereafter further rocking of the lever 118 serves to turn the shaft 111 to swing the gate 109 to open position. When the cam lever 103 turns to its initial position, the gate 109 is returned to closed position under the urge of spring 113, and thereafter further movement of the link 117 causes the latch 123 to engage the gate and lock the same in closed position.

Figure 12 represents a suitable electrical circuit which can be used. The alternating current supply lines L1 and L2 are shown connected through the line switch 131 and the conventional fuse block 132 with the several magnetic vibrators and rectifying means associated with the same. The vibrators for the dribble and bulk feed means of each feed device have been grouped together and marked 1, 2, 3, and 4. The magnetic winding of each dribble feed vibrator 22 has one terminal connected to the fuse block 132 in series with the scale switch 87, the load switch 133, the rheostat 134, and the rectifier 135. Each bulk feed vibrator has one terminal of its winding similarly connected to the fuse block 132, in series with the scale switch 86, load switch 136, controlling rheostat 137, and the rectifier 138. The other terminals of the windings of vibrators 22 and 21 of group 1 are connected to the common conductor 139, which connects back to the fuse block 132 through the switch 141 and conductor 142.

Similar to the connections thus described for group 1, terminals of the winding for group 2 are connected by conductor 143 to the fuse block 132 through the switch 144 and conductor 142. Likewise terminals of the windings in group 3 are connected by conductor 146 and switch 147 to the fuse block, and the corresponding terminals of group 4 are connected by conductor 148 and switch 149 to the fuse block. The switches 141, 144, 147 and 149 are mounted within the housing 101 (Figure 11). The operating elements of these switches are associated with the cam 151 which is mounted upon the adjacent end of shaft 97. Thus as the shaft rotates in operation of the machine these switches are operated in sequential order. Starting with the position of the cam 151, as illustrated, and assuming a direction of rotation as indicated, the order of operation of the switches is 144, 141, 149, and then 147. The operation of the switches just mentioned, together with the operation of the switches 86 and 87 associated with the weighing devices, controls the sequential operation of the magnetic vibrators.

It is desirable to provide a convenient arrangement of signal lamps in connection with the electrical circuit. Thus one signal lamp 152 is connected between conductor 142 and the line L2. This lamp is continuously lighted when the line switch 131 is closed. Two signal lamps 153 and 154 are associated with each dribble vibrator 22, the lamp 154 having for example a white color and being illuminated when the corresponding one of the switches 141, 144, 147 or 149, and switch 87, are closed. Lamp 153 may have a red color and is illuminated when dribbel vibrator 22 is disconnected by switches 141, 144, 147 or 149, and while switch 87 remains closed. Thus the illumination of red lamp 153 indicates that a container 26 has not received full weight within the normal period of time for a weighing operation and that correcting adjustments are required, such as increasing excitation of one or both of the vibrators, or changing the setting of collars 81 and 82. Another signal lamp 156 is shunted across the windings of each bulk vibrator 21.

Operation of my complete machine can be reviewed as follows: Assuming use with a bag handling machine of the type disclosed in my above mentioned application, bags are successively and intermittently conveyed into a filling station located below the lower discharge end of the hopper 16. This conveying means operates in synchronism with the rotation of the shaft 97. In the intervals between delivery of successive bags to the bag filling station, the feed devices are operated in conjunction with the weighing devices, to provide predetermined amounts of the product being packaged in the containers 26. Weighed amounts are supplied to the containers 26 successively, and when a gate 109 supporting a weighed quantity of material is opened, that particular quantity passes down through the hopper 16 into the bag at the filling station. Four (or any desired number) of feeding and weighing units are provided because the time interval for a complete feeding and weighing operation is greater than the time interval between successive bag filling operations. In other words the use of a plurality of feeding and weighing units makes possible high speed bag filling operations.

Initially the container 26 of the selected unit is empty and therefore it is in a raised position and the rod 60 in its lowermost position. Switch 86 is maintained closed by the collar 81, while switch 87 is likewise closed but is adapted to be operated to open the same. Since both switches 86 and 87 are closed, both of the vibrators 21 and 22 are energized, thereby causing flow of articles along both the bulk and dribble feed troughs. The dribble feed trough supplies articles at a relatively rapid rate to the container 26, until the amount of articles delivered approaches the weight desired. The container 26 now moves downwardly toward balance position, and this movement causes switch 86 to be opened and the small weight 92 to be picked up by the collar 91 (Figure 9). Thereafter the dribble feed vibrator 22 continues to be energized to supply articles at a relatively slow rate to the container 26. As the exact weight desired is reached, the rod 60 is raised sufficiently far to cause the switch 87 to be opened by collar 82. This serves to de-energize the vibrator 22. Rotation of the shaft 97 causes one of the cams 102 to operate the rocker arm 103, thereby tripping the latch 123 in the manner previously described and causing the gate 109 to move to open position. This serves to discharge the weighed quantity of the product into hopper 16, after which it drops into the open bag. In the manner just described the various units successively operate to supply weighed quantities of the product to the containers 26, and the discharge gates 109 of these containers are successively operated in synchronism with the bag handling machine to deliver the quantities successively into the open bags.

The action of the feed means described above can be better understood by reference to Figures 13, 14 and 15. In these views objects of considerable size are shown being handled, as for example dried prunes. Such articles are shown being discharged from the bulk trough 24 while at the same time objects are within the trough 32. Figure 14 illustrates how the objects in trough 32, particularly near the discharge end of the same, are arranged in single file, one behind the other. Near the left hand end of the trough 32 as viewed in Figure 13, the articles may be more or less indiscriminately piled upon the dribble trough with the result that as the articles move toward the right as viewed in Figure 13, some fall off into the bulk feed trough 24, until there is finally left a proper single file. Figure 15 illustrates operation of the dribble feed trough 32, without operation of the bulk feeding trough 24. Note that the articles are dropping off the discharge end of the trough 32, one at a time. This makes possible a weigh accurate to one article.

It will be evident from the foregoing that I have provided an automatic weighing machine which is well adapted for various types of automatic weighing operations. The feed means employed for supplying articles to the weighing device is particularly well adapted for accurate weighing operations and can be applied to a wide variety of articles, including, for example, such articles as dried prunes, various types of nuts and the like. Because of the manner in which the various units are coordinated for successively supplying measured quantities to bags or cartons in a filling station, it is evidence that the machine can be used for relatively high speed bag or carton filling operations.

I claim:

1. In a machine for automatic weighing of products, a weighing container, a pair of feed troughs having their discharge ends arranged to deliver product into said container, one of said troughs being for the bulk feeding of product and the other of said troughs being for dribble feeding, said dribble feed trough being relatively narrow compared to the bulk feed trough, both said troughs being disposed generally horizontal and the dribble feed trough being positioned to overlie bulk feed trough and spaced vertically therefrom, whereby product falling from the sides of the dribble feed trough is received in the bulk feed trough, said troughs having separate superposed product receiving portions, stationary hopper means for supplying product to the receiving portions of both troughs, and separate means for vibrating said troughs independently of the hopper to cause product to be conveyed along the same, said last means being operable to vibrate said dribble trough independently of the bulk feed trough, said dribble feed trough means being substantially V-shaped in section and proportioned to feed items of a product in single file.

2. A machine as in claim 1 together with means for regulating flow of the product along said troughs, said means comprising a wall portion extending across the dribble trough adjacent the said product receiving portion of the same and wall portions extending downwardly adjacent both sides of the dribble trough into the bulk feed trough.

3. A machine as in claim 1 in which a fin-like supporting arm extends from the rear portion of the dribble feed trough, said fin-like arm forming an attachment between said dribble feed trough and the means for vibrating the same.

4. A machine as in claim 1 in which the discharge end of the dribble feed trough extends beyond the discharge end of the bulk feed trough.

5. In a machine for the automatic weighing of products, a weighing container, bulk and dribble feed troughs having their discharge ends arranged to deliver product into the container, the dribble feed trough being relatively narrow compared to the bulk feed trough and the dribble feed trough being disposed above and spaced vertically from the bulk feed trough, said troughs having separate superposed product receiving portions, a hopper mounted above said superposed receiving portions to submerge said receiving portions with said product, the bulk feed trough forming a lower closure for the opening in said hopper, a pair of side wall extensions and a rear wall extension mounted on said hopper and extending downwardly into overlapping relationships with adjacent side and end wall portions of said bulk feed trough, magnetic means operatively connected to the bulk feed trough for vibrating the same, additional magnetic means for independently vibrating said dribble feed trough, a fin-like arm extending through the rear wall extension of said hopper and forming a connection between the receiving portion of said dribble feed trough and said additional magnetic means, and means adjustably mounted adjacent the front wall of said hopper for regulating the rate of flow of product in both said troughs, the discharge end of said dribble feed trough extending beyond the discharge end of said bulk feed trough whereby product dropping from said dribble feed trough will not fall upon the bulk feed trough to cause accidental discharge from product from the same.

6. An automatic weighing machine as in claim 5 wherein said dribble feed trough is V-shaped in section and proportioned to feed items of a product in single file.

References Cited in the file of this patent

UNITED STATES PATENTS

| | | |
|---|---|---|
| 2,116,934 | Rapp | May 10, 1938 |
| 2,139,903 | Mason | Dec. 13, 1938 |
| 2,332,600 | Rapp | Oct. 26, 1943 |
| 2,333,435 | Muskat | Nov. 2, 1943 |
| 2,352,114 | Muskat | June 20, 1944 |
| 2,626,042 | Aldridge | Jan. 20, 1953 |